March 24, 1942.　　D. E. GAMBLE　　2,277,221
FRICTION CLUTCH
Filed June 3, 1939　　2 Sheets-Sheet 1
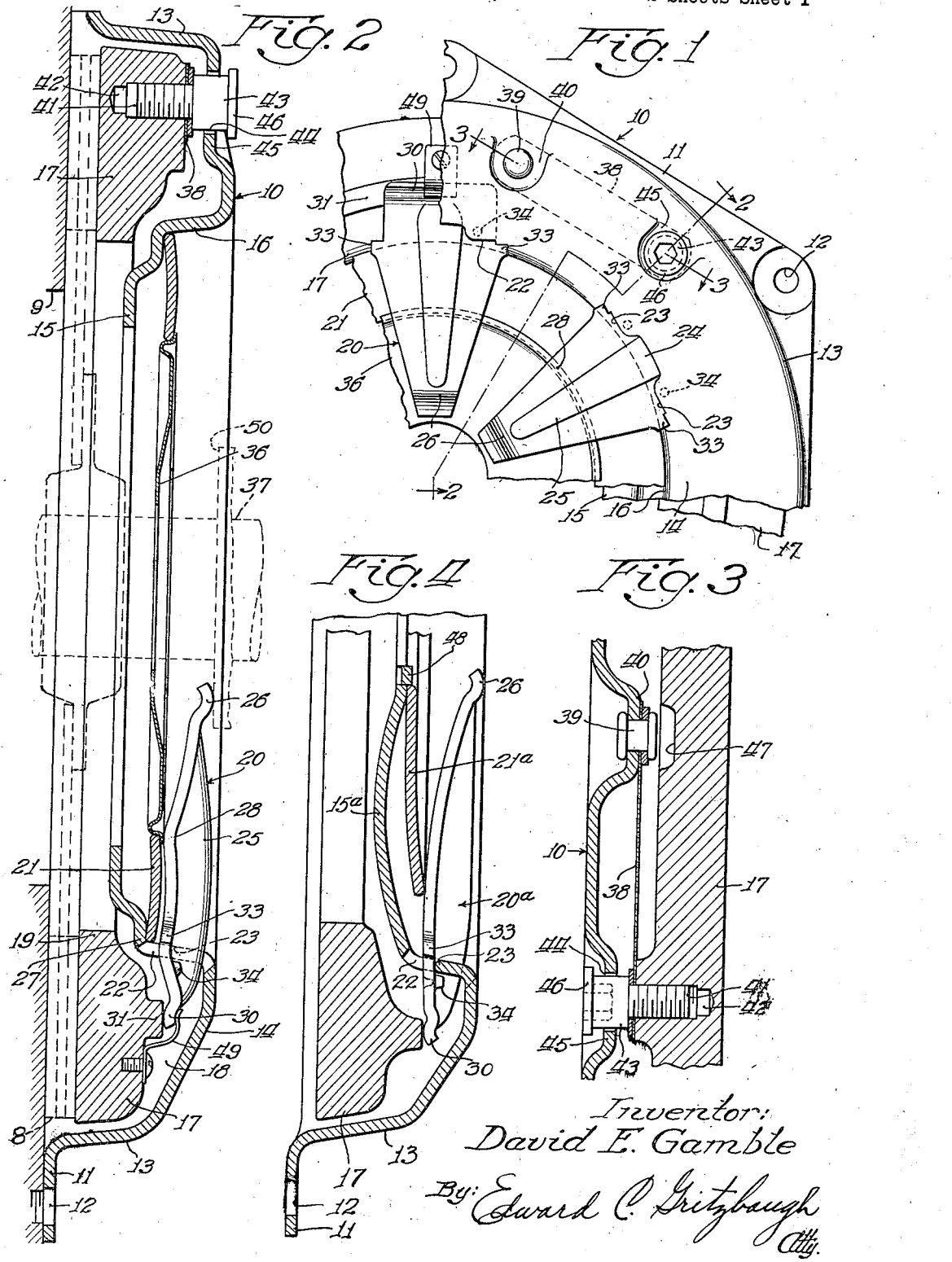
Inventor:
David E. Gamble
By: Edward C. Gritzbaugh
Atty.

March 24, 1942.  D. E. GAMBLE  2,277,221
FRICTION CLUTCH
Filed June 3, 1939    2 Sheets-Sheet 2
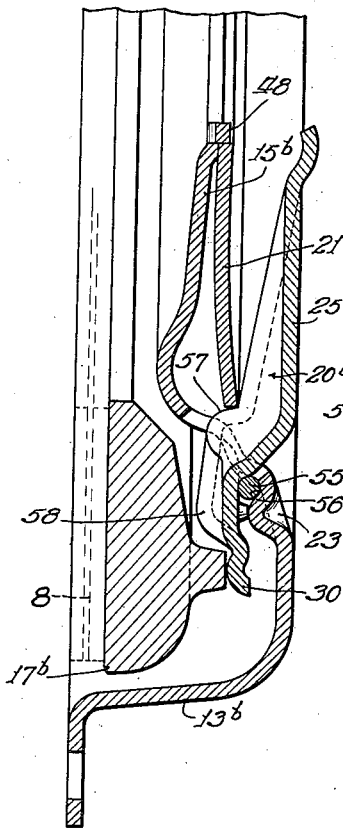
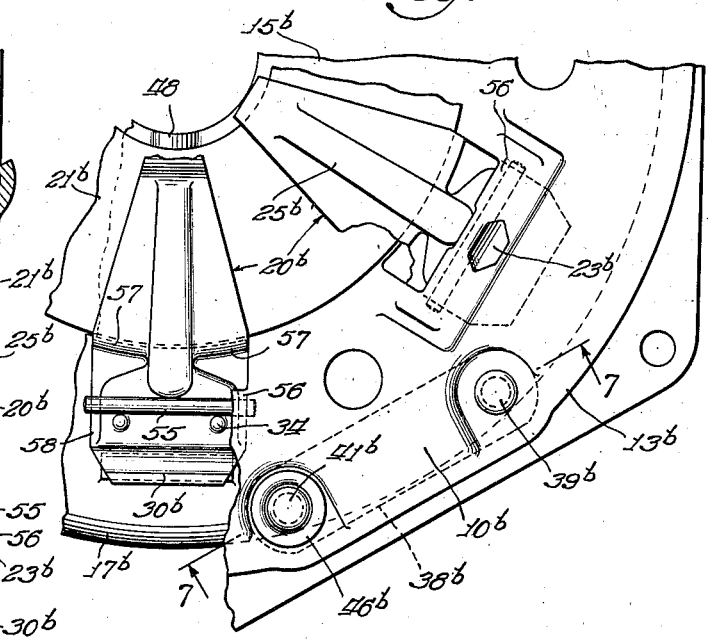
Inventor:
David E. Gamble
By: Edward C. Gritzbaugh
Atty.

Patented Mar. 24, 1942

2,277,221

UNITED STATES PATENT OFFICE 2,277,221

FRICTION CLUTCH

David E. Gamble, Chicago, Ill., assignor to Borg-Warner Corporation, Chicago, Ill., a corporation of Illinois Application June 3, 1939, Serial No. 277,239

14 Claims. (Cl. 192—68)

This invention relates to friction clutches of the type wherein the pressure for packing the clutch is provided by a spring in the form of a washer type annulus of spring sheet metal, coaxial with the axis of rotation of the clutch, such as is shown in the United States Letters Patent of Harold Nutt and Richard L. Smirl, Patent No. 2,219,139, issued October 22, 1940, and wherein clutch release is effected by levers extending through and fulcrumed in openings in the cover.

An object of the invention is to provide a clutch of this type wherein the release levers are maintained against their fulcrums under load at all times, so as to avoid the necessity of having the levers fit closely within the openings through which they project.

Another object of the invention is to provide a clutch of this type wherein all load is removed from the pressure plate and friction in the lever linkage is thereby largely eliminated as soon as the friction surfaces are disengaged.

The invention further aims to eliminate direct contact between the annular spring and the pressure plate, so as to prevent direct conduction of heat from the pressure plate to the spring, and thereby to avoid drawing the temper of the spring.

Another object of the invention is to provide an arrangement of the type referred to, wherein the necessity for the employment of means specifically designed for restraining the release levers from rattling, is eliminated.

Another object of the invention is to provide a clutch of the type specified above, wherein the annular spring is arranged to cooperate with a baffle plate for closing the annular opening between the clutch cover and the driven shaft, against the splashing of oil from the transmission into the clutch.

Another object is to provide a clutch having all of the foregoing characteristics, and, in addition, being greatly reduced in axial dimensions as compared to clutches previously available.

For the attainment of the foregoing objects, the invention contemplates, in general, a friction clutch comprising a driven plate, pressure plate, and annular cover, coaxially arranged one behind the other in the order named, said cover having a rim portion and a reentrant portion, the latter providing a forwardly facing fulcrum member, a washer type spring, having one periphery engaging a rear surface of said reentrant portion and its other periphery free to move forwardly in the flexing of the spring, and a release lever having at its outer end a pivotal connection with said pressure plate and engaging said fulcrum member and said free periphery of the spring at points successively spaced from its outer end in the order named, whereby said lever is adapted, when its inner end is moved forwardly, to pivot around said free periphery of the spring as a yielding fulcrum, with its outer end moving rearwardly to retract the clutch, and, when its inner end is allowed to move rearwardly, to pivot about said fulcrum member as a fixed fulcrum and to thereby transfer the spring pressure to the pressure plate for packing the clutch. As a result of this arrangement, the annular spring is located exteriorly of the space enclosed between the cover and the flywheel, in which space the pressure plate is located, and thereby shielded from the heat developed in the pressure plate. In addition, the arrangement provides for transmitting the spring pressure to the pressure plate through the medium of the release levers, so that the latter may remain under spring pressure from the annular spring at all times whether in releasing or engaging position, thereby eliminating the necessity for a close fit of the levers in the fulcrum openings, or for any additional means for holding the levers against rattling. The invention in this respect contemplates forming the lever fulcrums in the reentrant shoulder region of the cover in such a manner as to cooperate with projecting elements formed integrally in the levers themselves for locating and restraining the levers against displacement in either direction either radially or circumferentially, thereby eliminating all separate fulcrum members, joints, pivots and the like.

Another object of the invention is to provide an improved flexible drive link connection between the pressure plate and the cover, adapted to serve not only for driving the pressure plate from the cover plate, but also as a means for retaining the cover plate and pressure plate in assembled relation for shipping purposes, without interfering with the limited amount of axial movement between the pressure plate and cover plate, which is required for clutch operation.

Other objects, the advantages and uses of the invention will become more apparent after reading the following specification and claims, and after consideration of the drawings forming a part of the specification, wherein:

Fig. 1 is a fragmentary elevation of a clutch embodying the invention;

Fig. 2 is an axial sectional view of the same taken as indicated by the line 2—2 of Fig. 1;

Fig. 3 is a chordal sectional view of the same, taken as indicated by the line 3—3 of Fig. 1;

Fig. 4 is an axial sectional view of a clutch embodying another form of the invention;

Fig. 5 is a fragmentary elevation of another modification of the invention;

Fig. 6 is an axial sectional view thereof; and

Fig. 7 is a chordal sectional view thereof taken as indicated by the line 7—7 of Fig. 5.

Fig. 8 is a side elevation of the driving strap, in its unstressed state.

As an illustration of one form in which the invention may be embodied, I have shown in Figs. 1, 2 and 3, a clutch cover and pressure plate assembly including a reaction member or cover indicated generally at 10, having a peripheral flange 11 apertured as at 12, for attachment to the rear face of a driving member 9 such as the flywheel of an automobile engine, a rim portion 13 extending in a generally axial direction therefrom, a crown portion 14 extending in a generally radially inward direction from the rim portion 13, a reentrant central web portion 15, and a reentrant shoulder portion 16 connecting the central web portion 15 to the crown portion 14.

A pressure plate 17 is accommodated in the annular space 18 defined between the flywheel 9 and the cover 10, its inner periphery being thinned as at 19 where it extends into the restricted space between the reentrant central regions 15, 16 and the flywheel. A driven plate 8 is adapted to be engaged between the pressure plate 17 and the flywheel 9.

In the space defined within the reentrant shoulder 16 and the central region 15 of the cover, is accommodated all of the operating mechanism of the clutch per se. Such operating mechanism comprises simply the release levers 20 and the pressure spring 21 which is of the washer type.

Each release lever 20 extends through an opening 22 in the shoulder 16, and bears against fulcrums 23 facing toward the flywheel. The fulcrums 23, as shown in Fig. 1, are formed on the respective sides of a central region 24 of the opening 22, which is of greater axial depth than the side regions of the opening, so as to accommodate the reenforcing web 25 of the lever 20.

Intermediate the fulcrums 23 and their inner ends 26, the levers 20 are engaged against one periphery of the spring 21, the other periphery of the spring 21 being engaged against the reentrant region 15, 16 of the cover, from the rear. In the preferred form of the invention, the levers are engaged against the inner periphery of the spring and the outer periphery of the spring is engaged against an annular seat 27 formed in the re-entrant region intermediate the central web portion 15 and the shoulder 16. In the modified form of the invention shown in Fig. 4, the inner periphery of the spring 21a is in engagement with the reentrant central web region 15a of the cover and piloted on lugs 48 upstruck therefrom. The outer periphery of the spring is engaged against the release levers 20a. The remaining parts may be the same as in the preferred form of the invention, and are referred to by the same reference characters as are used in designating the corresponding parts of the preferred form. An advantage of the preferred form of the invention is that it gives a greater mechanical advantage to the lever in the application of pressure to the pressure plate 17.

The levers 20 are provided with humps 28 forming their regions of engagement with the spring 21, and intermediate the humps 28 and the fulcrums 23, are curved to conform to the curvature of the spring 21 so that they may lie as closely thereto as possible when the clutch is engaged. Since the fulcrums 23 of the lever and the fulcrum 27 of the spring 21 are very close together, the levers may be moved toward the flywheel by the application of releasing pressure to their inner ends 26, forcing the inner region of the spring to bow forwardly toward the flywheel, without any substantial change in the positions of the levers and the spring relative to each other. This is one factor in attaining a clutch of maximum shallowness and compactness in its axial dimension.

The inner ends 26 may be arranged in conjunction with a conventional clutch throwout collar 50, which is adapted to exert pressure against the inner ends 26 of the levers in the direction of the flywheel.

The outer ends 30 of the levers 20 engage the pressure plate 17 so as to transmit clutch packing pressure thereto. The engaging regions of the pressure plate 17 may be in the form of raised portions 31 as shown.

In former clutches of this type, wherein maximum axial shallowness was aimed at through the employment of an annular plate type spring the spring has been interposed between the pressure plate and the cover and the release levers arranged to exert a pull against the plate so as to overcome the pressure of the spring thereagainst. In such an arrangement it was considered necessary to employ anti-rattling devices to restrain the release levers when the clutch was engaged. The present invention provides an arrangement wherein the levers carry the spring load from the packing spring to the pressure plate, and are therefore under load at all times so as to at no time be free to rattle.

The constant load upon the levers in cooperation with certain locating means on the levers and the cover maintains them at all times against displacement from their proper positions with respect to the cover and pressure plate. The locating means mentioned comprises a pair of wings 33 forming the lateral extremities of each lever 20 immediately adjacent the regions thereof which are engaged against the fulcrums 23, said wings 33 engaging the radially inner surface of the shoulder region 16 of the cover, and a lug 34 formed in the lever on either side of the reenforcing web 25, spaced from the wings 33 longitudinally of the lever, and adapted to engage the radially outer surface of the shoulder region 16 just behind the fulcrum portions 23 thereof. The wings 33 restrain the levers from radially outward movement under centrifugal force during clutch operation, and the lugs 34 restrain the levers from dropping radially inwardly when the clutch is not in motion. Circumferential location of the levers 20 is accomplished by the confinement of the lateral edges of the levers between the circumferential extremities of the openings 22. The wings 33 and lugs 34 are spaced far enough apart in a circumferential direction to effectively restrain the levers against tilting movement in any direction except around the axis of the fulcrums 23.

The levers may be assembled or disassembled with respect to the cover with the utmost ease when the clutch unit is not installed in a motor vehicle, by simply moving the pressure plate 17 forwardly relative to the cover sufficiently to allow the levers to be pivoted around their fulcrums to positions wherein the pressure of the spring against them is relieved, whereupon the outer regions of the levers may be moved forwardly sufficiently to allow the lugs 34 to clear the fulcrums 23, and the levers may then be simply pulled inwardly through the openings 22. Sufficient space between the outer periphery of the spring 21 and the levers when engaged against the fulcrums 23, is provided for this purpose.

The levers 20 may be engaged against the spring 21 either directly or through the medium of the peripheral flange of an oil baffle plate 36, which may be of the type disclosed in the United States Letters Patent of Harold Nutt and Harold V. Reed, No. 2,240,346 issued Apr. 29, 1941. Thus the levers serve to maintain the baffle plate 36 in place, and the baffle plate 36 cooperates with the spring 21 in forming a closure for the annular space between the cover 10 and the driven shaft 37.

Referring now to Figs. 1 and 3, the pressure plate 17 is driven from the cover 10 through the medium of a flexible driving link 38, one end of which is secured as by means of a rivet 39 to a forwardly depressed region 40 in the cover and the other end of which is secured by means of a screw 41 to the pressure plate, the screw 41 being threaded into a blind hole 42 in the pressure plate so as not to interrupt the friction surface of the plate.

The screw 41 has a head 43 by means of which the end of the driving strip 38 is secured. The head 43 extends loosely through an opening 44 in a depressed region 45 of the cover, and is provided with a flange 46 adapted to engage the depressed region 45 for limiting the movement of the pressure plate relative to the cover plate. Thus the screw 41 serves the double function of securing the flexible drive link 38 to the pressure plate, and of securing the pressure plate and cover in assembled relation, so as to prevent accidental dissociation thereof during shipping of the clutch units. A plurality of the flexible drive links are employed, the number preferably being three and thus the parts, including the spring and release levers, will be securely held in assembled relationship to each other so that none can be dislocated. The removal of the release levers, hereinbefore described, is made possible by loosening the screws 41 to a sufficient extent to allow the pressure plate 17 to move out of the cover the distance required for releasing the levers from their fulcrums.

The flexible drive links 38 are positioned substantially in a common plane parallel to the friction surfaces. In the back and forth movement of the pressure plate they will flex so as to deviate slightly from this plane thus allowing the pressure plate to freely move while maintaining a driving connection between the cover and the pressure plate. They are disposed tangentially with reference to a circumference of the axis of rotation, whereby the load is transmitted through the links 38 as a straight pull along the longitudinal axes thereof.

The pressure plate is recessed as at 47 to receive the head of the rivet 39 when the pressure plate is retracted.

The invention contemplates that the links 38 may be preformed in such a manner that when assembled in a clutch they will have a bias in a direction to urge the pressure plate 17 away from the flywheel. This feature would make it possible to eliminate means, such as the clips 49 of Fig. 2 for effecting retraction of the pressure plate as the levers are depressed. Fig. 4 is intended to illustrate an arrangement wherein retraction is effected by the links 38.

The springs 21 and 21a are preferably of the curved radial cross-section, negative deflection rate type illustrated in the Patent No. 2,219,139 issued October 22, 1940, above referred to. Such a spring, particularly when it is relatively narrow in radial width as in the form shown in Figure 2, is most easily constructed with a relatively high load resisting strength and a limited capacity for axial distortion within its most efficient operating range, i. e., the range of its negative deflection rate. Accordingly, the form of the invention shown in Fig. 4 has the advantage that it permits a greater radial width in the spring and does not necessitate as great an axial distortion for a given amount of pressure plate movement, the latter being true because of the nearer proximity of the fulcrum to the point of engagement between the levers and the spring.

In the form shown in Fig. 2 the levers 20 serve as the means for securing the baffle plate 36 in place. In the form shown in Fig. 4, the baffle is not necessary, since the central region 15a of the cover performs that function.

In the operation of the clutch, the releasing of the clutch pedal, attended by the backing away of the release collar, allows the spring 21 or 21a to move the inner regions of the levers rearwardly, causing the levers to pivot about the fulcrums 23 and to transfer the spring pressure to the pressure plate for packing the clutch. When the inner ends of the levers are forced forwardly by the collar, the levers will fulcrum against the annular spring so as to maintain their fulcrum regions in engagement with the fulcrums 23, and to cause their outer ends to move rearwardly as they pivot around the fulcrums 23, thereby retracting the pressure plate.

A further modified form of the invention is shown in Figures 5, 6 and 7. This form resembles the form shown in Figure 4, adding certain improvements thereto. The lever 20b is fulcrumed against the reentrant shoulder region 23b of the cover 13b through the medium of a hardened pin 55 which is seated in a pocket 56 formed in the shoulder 23b. In addition to the lug 34 for restraining the levers against radially inward movement, the levers are provided with shoulders 57 which are positioned close to the periphery of the annular spring 21b although not completely in engagement therewith. Any tendency of a lever to tilt laterally in the plane of its fulcrum, will be prevented by contact of one or the other of the shoulders 57 with the edge of the spring. The spring being piloted at 48, in the central web portion 15b of the cover, will remain centered with relation to the axis of rotation.

The axis of the fulcrum pin 55 is so located with reference to the spring 21b that the periphery of the spring tends to maintain the same spacing with relation to the shoulders 57 during all positions of spring displacement. As the spring is flattened out during clutch release, it tends to increase slightly in diameter. At the same time, the shoulders 57, as the levers 20b are pivoted about their fulcrums in clutch release direction, tend to move away from the periphery of the spring. Thus the arc of swing of the shoulders 57 substantially coincides with that of the edge of the spring 21b.

The shoulders 57 have the added function of increasing the thickness of the lever just inwardly of the fulcrum pin 55. This is important in view of the fact that in order to adapt the lever to the fulcrum pin, the reenforcing web 25b must be terminated at the fulcrum and the reenforcing of the outer extremities of the levers is in the form of side flanges 58, which begin just inwardly of the pressure plate engaging end portion 30b, extend past the fulcrum 55, and terminate in the shoulders 57.

The flexible driving link 38b employed in this form of the invention is attached to the pressure plate by means of a rivet 41b, and the pressure plate 17b and cover 10b are maintained in assembled relationship by a cupped washer 46b secured between the head of the rivet 41b and the links 38b and extending through an opening 44b in the cover plate 10b. The other end of the link 38b is secured to the cover plate in the same manner as shown in Fig. 3, by means of a rivet 39b.

As in the form shown in Fig. 4, the driving links 38a are arranged to serve as retractor springs in addition to their driving function. To this end, the springs are preformed so that when unstressed their end regions are offset in different planes, spaced apart as indicated at $a$ in Fig. 8. When assembled, the end regions of the spring are forced into substantially the same plane, thus biasing the spring under tension which urges the pressure plate in clutch releasing direction.

I claim:

1. In a friction clutch, a driven plate, pressure plate, and annular cover, coaxially arranged one behind the other in the order named, said cover having a rim portion and a reentrant portion, the latter providing a forwardly facing fulcrum member, a washer type spring, having one periphery engaging a rear surface of said reentrant portion and its other periphery free to move forwardly in the flexing of the spring, and a release lever having its outer end in pressure transmitting association with said pressure plate and engaging said fulcrum member and said free periphery of the spring at points successively spaced from its outer end in the order named, whereby said lever is adapted, when its inner end is moved forwardly, to be maintained by said spring in engagement with said fulcrum and to pivot around said fulcrum, with its outer end moving rearwardly to release the clutch, and, when its inner end is allowed to move rearwardly, to pivot about said fulcrum member and to thereby transfer the spring pressure to the pressure plate for packing the clutch.

2. A friction clutch as defined in claim 1, wherein the spring is arranged to exert pressure against said lever in all positions of clutch operation including full release position, whereby to maintain the lever in engagement with said fulcrum at all times to prevent rattling.

3. In a friction clutch, a driven plate, pressure plate and reaction means, arranged one behind the other in the order named, said reaction means having a radially outer region for attachment to a driving member, a portion extending rearwardly and then radially inwardly around the pressure plate, and a forwardly extending portion providing a forwardly facing fulcrum member, a washer type spring having one periphery engaging a rear surface of said forwardly extending portion and its other periphery free to move forwardly in the flexing of the spring, and a release lever engaging said pressure plate at its outer end and engaging said fulcrum member and said free periphery of the spring at points spaced from said outer end in the order named, said spring being arranged to exert pressure against said lever in all positions of clutch operation including fully released position, whereby to maintain the lever in engagement with said fulcrum at all times to prevent rattling.

4. In a friction clutch, a driven plate, pressure plate and annular cover, coaxially arranged one behind the other in the order named, said cover having a rim portion and a reentrant portion, the latter provided with an opening, a washer type spring having one periphery engaging a rear surface of said reentrant portion and its other periphery free to move forwardly in the flexing of the spring, and a release lever extending through said opening, engaging said pressure plate at its outer end, and engaging said free periphery of the spring intermediate its ends to provide a yielding fulcrum against which it may react when its inner end is moved forwardly so as to cause its outer end to move rearwardly and retract the pressure plate.

5. In a friction clutch, a driven plate, pressure plate and reaction means, arranged one behind the other in the order named, said reaction means having a radially outer region for attachment to a driving member, a portion extending rearwardly and then radially inwardly around the pressure plate, and a forwardly extending portion providing a forwardly facing fulcrum member, a washer type spring, having its outer periphery engaging a rear surface of said forwardly extending portion and its inner periphery free to move forwardly in the flexing of the spring, and a release lever engaging said pressure plate at its outer end and engaging said fulcrum member and said inner periphery of the spring at points spaced from said outer end in the order named said spring maintaining said lever in engagement with said fulcrum member.

6. In friction clutch, a driven plate, pressure plate and reaction means coaxially arranged one behind the other in the order named, said reaction means having an outer region for attachment to a driving member, a portion extending rearwardly and thence radially inwardly around the pressure plate, and a forwardly extending portion providing a forwardly facing fulcrum member, a washer type spring, having its inner periphery engaging a rear surface of said forwardly extending portion and its outer periphery free to move forwardly in the flexing of the spring, and a release lever engaging said pressure plate at its outer end and engaging said fulcrum member and said outer periphery of the spring at points spaced from said outer end in the order named, said spring maintaining said lever in engagement with said fulcrum.

7. In a friction clutch, a driven plate, a pressure plate and an annular cover, coaxially arranged one behind the other in the order named, said cover having a rim portion, a central web portion and a reentrant shoulder region connecting said portions, said shoulder region providing a forwardly facing fulcrum member, a washer type spring having its inner periphery engaging a rear surface of said web portion and its outer periphery free to move forwardly in the flexing of the spring, and a release lever engaging said pressure plate at its outer end, and engaging said fulcrum member and said free periphery of the spring at points spaced from said outer end in the order named, said spring maintaining said lever in engagement with said fulcrum member.

8. In a friction clutch, a driven plate, pressure plate and annular cover, coaxially arranged one behind the other in the order named, said cover having a rim portion, a central web portion, and a reentrant shoulder region connecting said portions, said web portion being substantially parallel to the plane of the friction faces, a washer type spring having its inner periphery in engagement with the rear side of and substantially registering with the inner periphery of said web portion, and having its outer periphery spaced rearwardly of said web portion, and a release lever engaging said pressure plate at its outer end, projecting through an opening in said reentrant shoulder, fulcrumed against a forwardly facing edge of said opening, and engaging said outer periphery of the spring.

9. In a friction clutch, a driven plate, pressure plate, and annular cover, coaxially arranged one behind the other in the order named, said cover having a rim portion and a reentrant portion, the latter providing a forwardly facing fulcrum member, a generally frusto-conical spring, having one periphery engaging a rear surface of said reentrant portion and its other periphery free to move forwardly in the flexing of the spring, and a release lever having its outer end in engagement with said pressure plate and engaging said fulcrum member and said free periphery of the spring at points successively spaced from its outer end in the order named, whereby said lever is adapted, when its inner end is moved forwardly, to pivot around said fulcrum, with its outer end moving rearwardly to release the clutch, and, when its inner end is allowed to move rearwardly, to react against said fulcrum member and to thereby transfer the spring pressure to the pressure plate for packing the clutch.

10. A friction clutch as defined in claim 9, wherein said spring has an arched cross section.

11. A friction clutch as defined in claim 9, wherein said spring has an arched cross section and a negative deflection rate, within its operating range in the clutch.

12. In a friction clutch, a driven plate, pressure plate and annular cover, coaxially arranged one behind the other in the order named, said cover having a rim portion and a reentrant shoulder, the latter providing a forwardly facing fulcrum member, and having an annular seat portion projecting radially inwardly from its forward extremity, a washer type spring having its outer periphery piloted within said shoulder and engaged against said seat portion, said spring being inclined radially inwardly and rearwardly, and a release lever in engagement with said pressure plate at its outer end, engaging the inner region of the rear face of said spring, and engaging said fulcrum intermediate its pivotal connection with the pressure plate and its region of engagement with the spring.

13. In a frictional clutch, a driven plate, a pressure plate and reaction means, arranged one behind the other in the order named, said reaction means having a radially outer flange portion for attachment to a driving member, a portion extending rearwardly and thence inwardly along the pressure plate, and a portion extending forwardly and terminating in a radially inwardly extending spring seat portion, said forwardly extending portion being formed with an opening and a rearwardly depressed region forming a fulcrum pin seat, a fulcrum pin seated in said fulcrum pin seat and presenting a forwardly facing fulcrum, a washer type spring having its inner periphery engaging said spring seat and its outer periphery free to move forwardly in the flexing of the spring, and a release lever engaging said pressure plate at its outer end, extending through said opening, and engaging said fulcrum pin and said free periphery of the spring at points spaced from said outer end in the order named, said spring maintaining said lever in engagement with said fulcrum pin at all times.

14. In a friction clutch, a driven plate, a pressure plate and reaction means, arranged one behind the other in the order named, said reaction means having a radially outer flange portion for attachment to a driving member, a portion extending rearwardly and thence inwardly along the pressure plate, and a portion extending forwardly, said forwardly extending portion having an opening, presenting a forwardly facing fulcrum member at the rear extremity of said opening, and terminating on the other side of said opening in an inwardly extending web portion, a washer type spring having its inner periphery engaging said web portion and its outer periphery free to move forwardly in the flexing of the spring, and a release lever engaging said pressure plate at its outer end, extending through said opening, and engaging said fulcrum pin and said free periphery of the spring at points spaced from said outer end in the order named, said spring maintaining said lever in engagement with said fulcrum, said lever being formed, just outwardly of the region of contact with said spring, with a shoulder adapted to coact with the outer edge of the spring for restraining the lever from circumferential tilting.

DAVID E. GAMBLE.